United States Patent
Brookler et al.

(10) Patent No.: US 10,496,647 B2
(45) Date of Patent: Dec. 3, 2019

(54) DELAY DETECTION IN QUERY PROCESSING

(71) Applicant: Microsoft Technology Licensing, LLC, Redmond, WA (US)

(72) Inventors: David Edward Brookler, Maalot (IL); Tomer Weisberg, Haifa (IL); Oren Yossef, Haifa (IL); Tomer Rotstein, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 279 days.

(21) Appl. No.: 15/489,897

(22) Filed: Apr. 18, 2017

(65) Prior Publication Data
US 2018/0300370 A1    Oct. 18, 2018

(51) Int. Cl.
*G06F 16/2453*    (2019.01)
*G06F 16/2455*    (2019.01)
*G06F 16/248*    (2019.01)

(52) U.S. Cl.
CPC ...... *G06F 16/24549* (2019.01); *G06F 16/248* (2019.01); *G06F 16/24545* (2019.01); *G06F 16/24553* (2019.01)

(58) Field of Classification Search
CPC ......... G06F 16/24549; G06F 16/24553; G06F 16/24545; G06F 16/248
(Continued)

(56) References Cited

U.S. PATENT DOCUMENTS

| 5,615,386 A | * | 3/1997 | Amerson | G06F 9/30058 |
| | | | | 712/238 |
| 5,649,139 A | * | 7/1997 | Weinreb | G06F 12/0813 |
| | | | | 711/202 |

(Continued)

FOREIGN PATENT DOCUMENTS

| WO | WO-2009019104 A1 | * | 2/2009 | G06F 11/2023 |
| WO | WO-2015172533 A1 | * | 11/2015 | G06F 16/00 |

OTHER PUBLICATIONS

Ditzel et al., "Branch Folding in the CRISP Microprocessor: Reducing Branch Delay to Zero", ACM, 1987, pp. 2-9. (Year: 1987).*
(Continued)

*Primary Examiner* — Phung Thao Cao
(74) *Attorney, Agent, or Firm* — Alleman Hall Creasman & Tuttle LLP

(57) ABSTRACT

Query processors often receive queries to be processed against a data set, such as by inserting user input into parameterized fields of a query template. Some queries may include a conditional statement, and manipulation of user input (e.g., injection attacks) may introduce a delay through a conditional branch. The time required to fulfill the query may indicate which conditional branch was taken, thus revealing properties of the data set that are intended to be withheld. Instead, a query processor may examine the query to identify, between a pair of conditional branches, a processing delay of the first conditional branch as compared with the second conditional branch. The query processor may identify a query adaptation that reduces the processing delay of the first conditional branch as compared with the second conditional branch, and evaluate the query against the data set according to the query adaptation to present a query result.

20 Claims, 7 Drawing Sheets

(58) Field of Classification Search
USPC .......................................................... 707/720
See application file for complete search history.

(56) References Cited

U.S. PATENT DOCUMENTS

| | | | | |
|---|---|---|---|---|
| 5,784,604 | A * | 7/1998 | Muhich | G06F 9/3804 |
| | | | | 712/238 |
| 5,790,044 | A * | 8/1998 | Lin | H04M 3/533 |
| | | | | 340/7.23 |
| 7,076,640 | B2 * | 7/2006 | Kadambi | G06F 9/30058 |
| | | | | 712/233 |
| 7,702,692 | B2 | 4/2010 | Chandrasekaran | |
| 7,941,426 | B2 * | 5/2011 | Bestgen | G06F 9/5027 |
| | | | | 707/718 |
| 8,225,402 | B1 | 7/2012 | Averbuch et al. | |
| 8,266,177 | B1 | 9/2012 | Seymour et al. | |
| 8,290,937 | B2 | 10/2012 | Barsness et al. | |
| 8,583,608 | B2 | 11/2013 | Barsness et al. | |
| 10,162,859 | B2 * | 12/2018 | Barsness | G06F 16/24547 |
| 2003/0084030 | A1 * | 5/2003 | Day | G06F 16/2453 |
| 2007/0067352 | A1 * | 3/2007 | McCall | G06F 16/217 |
| 2007/0073655 | A1 * | 3/2007 | Chen | G06F 16/24568 |
| 2010/0082603 | A1 | 4/2010 | Krompass et al. | |
| 2010/0153363 | A1 * | 6/2010 | Suzuki | G06F 16/24542 |
| | | | | 707/720 |
| 2011/0320434 | A1 * | 12/2011 | Carston | G06F 16/24542 |
| | | | | 707/718 |
| 2012/0136850 | A1 * | 5/2012 | Barsness | G06F 16/24561 |
| | | | | 707/720 |
| 2013/0024442 | A1 * | 1/2013 | Santosuosso | G06F 16/245 |
| | | | | 707/720 |
| 2013/0090745 | A1 * | 4/2013 | Frazer | G05B 15/02 |
| | | | | 700/12 |
| 2013/0325842 | A1 * | 12/2013 | Asai | G06F 16/8365 |
| | | | | 707/716 |
| 2014/0297621 | A1 * | 10/2014 | Hu | G06F 16/245 |
| | | | | 707/722 |
| 2014/0358934 | A1 * | 12/2014 | Hirose | G06F 16/27 |
| | | | | 707/741 |
| 2014/0379690 | A1 * | 12/2014 | Ahmed | G06F 16/24535 |
| | | | | 707/713 |
| 2016/0092599 | A1 * | 3/2016 | Barsness | G06F 16/90335 |
| | | | | 707/718 |
| 2016/0110439 | A1 * | 4/2016 | Hrle | G06F 16/273 |
| | | | | 707/600 |

OTHER PUBLICATIONS

Lee et al., "A novel method for SQL injection attack detection based on removing SQL query attribute values", Mathematical and Computer Modelling, vol. 55, Issues 1-2, Jan. 2012, pp. 58-68. (Year: 2012).*
Du et al., "Reducing Multidatabase Query Response Time by Tree Balancing", in Proceedings of the 1995 ACM SIGMOD International Conference on Management of Data, San Jose, California, USA, May 22-25, 1995, pp. 293-303. (Year: 1995).*
Dubey et al., "Branch Strategies: Modeling and Optimization", Technical Report: CSL-TR-90-411, Feb. 1990, 52 pages. (Year: 1990).*
Song et al., "An Enhanced Concurrency Control Scheme for Multidimensional Index Structures", IEEE Transactions on Knowledge and Data Engineering, vol. 16, No. 1, Jan. 2004, pp. 97-111. (Year: 2004).*
"Configure the query governor cost limit Server Configuration Option", Published on: Apr. 19, 2012 Available at: https://msdn.microsoft.com/en-us/library/ms191219.aspx.
"Time-Based Blind SQL Injection Attacks", Published on: Apr. 28, 2013 Available at: http://www.sqlinjection.net/time-based/.
"Blind SQL Injection", Published on: Sep. 3, 2013 Available at: https://www.owasp.org/index.php/Blind_SQL_Injection.
"Time-Based Blind SQL Injection Using Heavy Queries and the Marathon Tool", Published on: Aug. 11, 2008 Available at: https://labs.mwrinfosecurity.com/blog/defcon-16-talk-review-time-based-blind-sql-injection-using-heavy-queries-and-the-marathon-tool/.
"How Parallel Execution Works", Published on: Dec. 28, 2011 Available at: https://docs.oracle.com/cd/E11882_01/server.112/e25523/parallel002.htm.
"SAP Sybase", Published on: May 22, 2013 Available at: http://infocenter.sybase.com/help/index.jsp?topic=/com.sybase.infocenter.dc00801.1601/doc/html/jcu1332357637622.html.
Alonso, Chema, "Time-Based Blind SQL Injection with Heavy Queries", Published on: Sep. 12, 2007 Available at: https://technet.microsoft.com/en-us/library/cc512676.aspx.

* cited by examiner

DELAY DETECTION IN QUERY PROCESSING

BACKGROUND

Within the field of query processing, many query processors are provided that accept queries from a variety of sources, potentially including queries from unknown and/or untrusted sources. Queries may be specified in a query language, such as a variant of the Structured Query Language (SQL) or XPath, and may be processed against a data set such as the tables of an SQL database to generate and return a query result.

Many such scenarios involve data sets that are secured by various mechanisms, such as restrictions on which tables are available for querying; which records of a table may be queried and/or disclosed; and whether the schema of a particular table is available for inspection. For example, a customer of a service may be permitted to query the record of a Customers table that corresponds to the customer's account, but may not be permitted to access the records of any other customer. The restrictions over the data set may extend to metadata of the data set, such as the number of records in a table, whether or not a table or attribute with a particular name exists, and whether or not particular objects of the data set are protected by a security mechanism.

Administrators of the data set may seek to protect these properties from unauthorized access. For example, queries provided by untrusted users may be evaluated in a limited security context that restricts access to a particular data set, such as prohibiting access to tables that such users are not permitted to access. The evaluation of the query within these security constraints may block the user from inspecting or accessing properties of the data set that are to be withheld from the users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In query processing scenarios, some queries may permit a conditional operator, where a criterion is evaluated and different branches of query logic are executed following the evaluation of the criterion. For example, a test of a particular property may be specified, where one branch of the query may be executed if the test evaluates to True, and another branch of the query may be executed if the test evaluates to False.

Additionally, in query processing scenarios, some query operators may take variable amounts of time to execute. As a first example, a simple SELECT query that returns records almost instantaneously, while a complicated JOIN or ORDER BY operation performed over the same set of records may entail an extended processing delay. As a second example, an operation performed over one record may be completed much faster than the same operation performed over a large number of records of the table. As a third example, some query languages permit the inclusion of a SLEEP operator that inserts an idle delay into the processing of the query.

However, the combination of these features may lead to unforeseen consequences. In particular, a query may be designed with a conditional operator and a pair of branches that are taken based on the results of the conditional evaluation—e.g., the first branch may take 60 seconds to complete, whereas the second branch takes 10 seconds to complete. Moreover, the condition may target a property of the data set that is revealed based upon which conditional branch is taken. A user may therefore be capable of querying properties of the data set by choosing a conditional based upon a property of interest, and measuring the response of the query to determine whether the first conditional branch or the second conditional branch was taken. This result may manifest even if the property upon which the condition is predicated is not directly available for inspection.

One technique in which such queries may be presented involves injection. A parameterized query template is provided that is believed to be safe to execute is provided, where some fields of the query are fillable by parameters provided from users and are encapsulated from the rest of the query. A user may provide malformed user input that escapes the encapsulation, and may alter the logic of the query to introduce a delay. Whether or not the delay is executed may depend on the evaluation of the other fields of the query, and may therefore reveal information about the data set that was not intended to be revealed.

For example, a data set may be configured to restrict a query result that reveals a number of records in the data set. A query may specify a condition may specify a first conditional branch (featuring a delay operation) that is to be taken if the record count exceeds a specific number, and a second conditional branch (not featuring a delay operation) that is to be evaluated if the condition is not taken. The user may submit the query to the data set, and may measure the response time to determine whether or not the conditional branch has been taken. In this manner, the user may be permitted to query properties of the data set that are not intended to be available for inspection, such as the existence of particular records; the values stored in particular records; the number of records in a data set; and the schema of a data set that may enable further unauthorized exploration of the data set, including a device through which the data set is provided.

Presented herein are techniques that may be utilized to protect a data set from such exploratory techniques. In accordance with these techniques, a query processor receives a query over a data set, and endeavors to provide a query result in the following manner. The query processor examines the query to identify a condition between a first conditional branch and a second conditional branch, and a processing delay of the first conditional branch as compared with the second conditional branch. The query processor further identifies a query adaptation that reduces the processing delay of the first conditional branch as compared with the second conditional branch. The query processor therefore evaluates the query against the data set according to the query adaptation to produce the query result, and presents the query result to fulfill the query. In this manner, the query processor provides a query result in response to the query that may reduce the unintended disclosure of properties of the data set in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
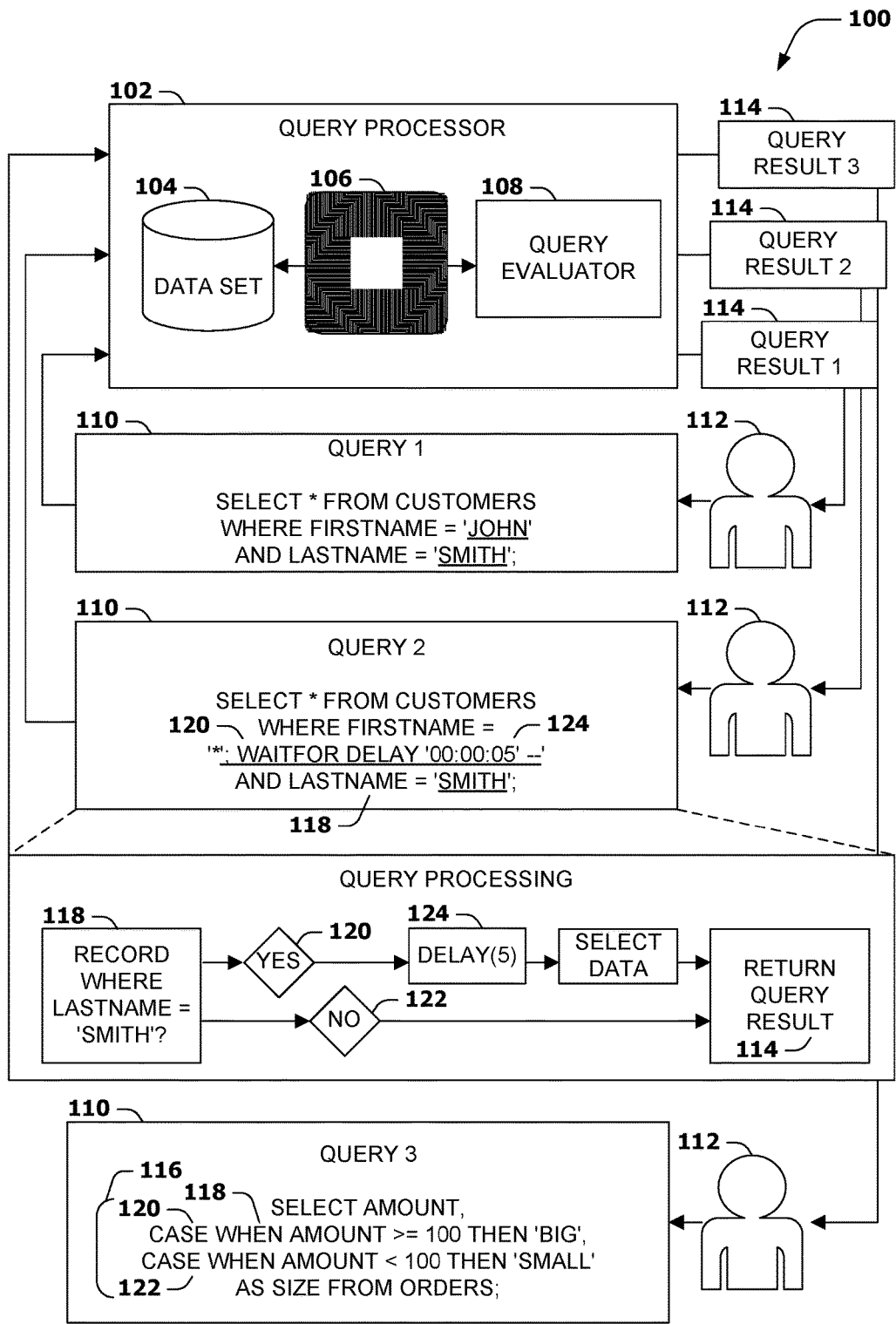
FIG. 1 is an illustration of an example scenario featuring an evaluation of a query against a data set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring a query processor 102 that processes a query 110 against a data set 104 on behalf of a set of users 112. In this example scenario 100, the query processor 102 comprises a processor 106 executing instructions that provide a query evaluator 108, and the queries 110 provide a set of logical operations to be applied by the query evaluator 108 against the data set 104 to produce a query result 114, which is returned to the users 112 to fulfill the query 110. In such scenarios, it may be desirable to limit the types of queries that users 112 are permitted to execute against the data set 104. For instance, a customer of a service may be permitted to access a record of a Customers table of the data set 104 that represents the account of the customer, but not the records of any other customers represented in the Customers table of the data set 104.

As a first such example, a first user 112 is presented with a form that receives the first name and last name of the user 112. The user 112 may be permitted to provide user input to these fields, which may be inserted into a parameterized query 110, where the user input is encapsulated to identify different properties of the query 110. It may be additionally desirable to limit the records that the user 112 is permitted to query, and/or the query results 114 returned therefor. For instance, if the user 112 specifies his or her first and last name, the parameterized query 110 may first verify that this user 112 is permitted to access the identified record, and then return a query result 114 with the contents of the record; and if the user 112 submits the name of a record that exists but that the user 112 is not permitted to access, the query processor 102 may return an error message instead of a query result 114. In this manner, the query processor 102 may apply a security policy over the data set 104 for the queries 110 submitted by the users 112.

However, in some circumstances, a user 112 may attempt to explore portions of the data set 104 that are not authorized for inspection. If the user 112 submits a query 110 directly requesting the off-limits portion of the data set 104, the query processor 102 may return an error. However, in some scenarios, the user 112 may be capable of circumventing such protective measures. For instance, in the example scenario 100 of FIG. 1, a second user 112 submits data for the form that specifies a first name and a last name. By entering malformed data for the first name field, the user 112 may cause a portion of the query 110 to inject a delay 124 into the query 110, using a logical delay operator that is supported by the query language of the query 110 and the query processor 102. One such example involves SQL injection, wherein the user 112 introduces an extra single quote or double quote into a string field that is typically encapsulated by single- or double-quotes, followed by a delay instruction. The premature interruption of the string value causes the following instructions to be executed rather than treated as string-type user input, and therefore introduce a delay 124 into the processing of the query 110. Moreover, the delay 124 may be imposed on one branch of a condition 118 of the query 110, such as the second parameter of the template query. This condition 118 may be based upon data that the user 112 is not necessarily authorized to access, such as the last name of a different record of the data set 104. While injection attacks are often avoidable, e.g., by "sanitizing" the data to remove extraneous symbols that escape the encapsulation of the parameter, an imperfectly secured data set 104 may fail to sanitize one or more parameters of a query 110 and therefore exhibit a vulnerability to a SQL injection attack. Other techniques may be utilized to modify a provided query 110, such as buffer overruns through other interaction with a device 102 that may alter the instructions comprising the query 110, the query processor 102, and/or the data set 104.

While processing this malformed query, the query processor 102 may exhibit a differential behavior based upon the condition 118. For example, the condition 118 of the query 110 (e.g., the "LASTNAME" portion of the parameterized query 110) may be evaluated. If this condition 118 evaluates to True or Yes (due to the presence of a matching record), the query processor 102 may execute a first conditional branch 120 that includes the delay 124, before returning a query result 114 (which may indicate, e.g., that the query 110 cannot be fully evaluated). However, if the condition 118 evaluates to False or No (due to the absence of any matching record), the query 110 may execute a second conditional branch 122 that does not involve the delay 124—e.g., via "short-circuit" logic that, upon failing one criterion of a Boolean AND operation, causes the other criterion to be skipped for evaluation due to mootness. Although the contents of the query result 114 may not include protected data, the second user 112 may be able to determine which conditional branch of the query 110 was taken by measuring the timing of the query result 114—thus determining whether or not the condition 118 was satisfied during the processing of the query 110 by the query processor 102.

A second example of such unauthorized exploration of the data set 104 includes a query received from the user 112 that specifies a condition 118, including a first conditional branch 120 that involves a significant amount of data processing (e.g., a calculation provided over a large set of data), and a second conditional branch 122 that involves a reduced amount of data processing (e.g., a calculation provided over a reduced set of data). Even if the calculation and the data over which the calculation is applied are authorized for the user 112, the evaluation 116 of the condition 118 upon which such calculations are based may specify data or metadata of the data set 104 that the user 112 is not directly permitted to access. For example, a query 110 may specify a threshold value as a condition 118, an extensive data processing calculation for each record for which the condition 118 is satisfied (as the first condition branch 120), and a smaller calculation for each record for which the condition 118 is not satisfied (as the second conditional branch 122). Even if the user 112 is not permitted to query the value of the data set 104 directly for return in the query result 114, the query may be crafted (e.g., using injection) to utilize the value as a condition 118 upon which different conditional branches are processed. If the amount of time involved in processing each record through each conditional branch is known and/or identifiable, then the total amount of time involved in processing the query 114 may reveal the number of records that satisfy and/or do not satisfy the criterion, particularly if many such queries are executable against the data set 104 specifying a variety of conditions. The delay 124 may therefore reveal details about the data set 104 even if the actual contents of the query result 114 provide no significant information.

In these and other scenarios, the security vulnerabilities arise from the presence of a condition 118 in a query 110, where a first conditional branch 120 that is executed based on the condition 118 involves a delay 124 as compared with the execution of a second conditional branch 122 of the query, and where the evaluation of the condition 118 reveals some properties of the data set 104 contrary to a security policy. Such properties may include, e.g., the names, values, number, and/or existence various data set objects, such as records, values, or attributes stored in a table and/or the tables of the data set 104; the existence or details of user accounts, stored queries or procedures, business logic, and security policies; and the details of the query processor 102, including the processor 106 and other resources that are accessible to the query processor 102. In this manner, techniques such as SQL injection may circumvent security policies of the data set 104.

B. Presented Techniques

Figure 2:
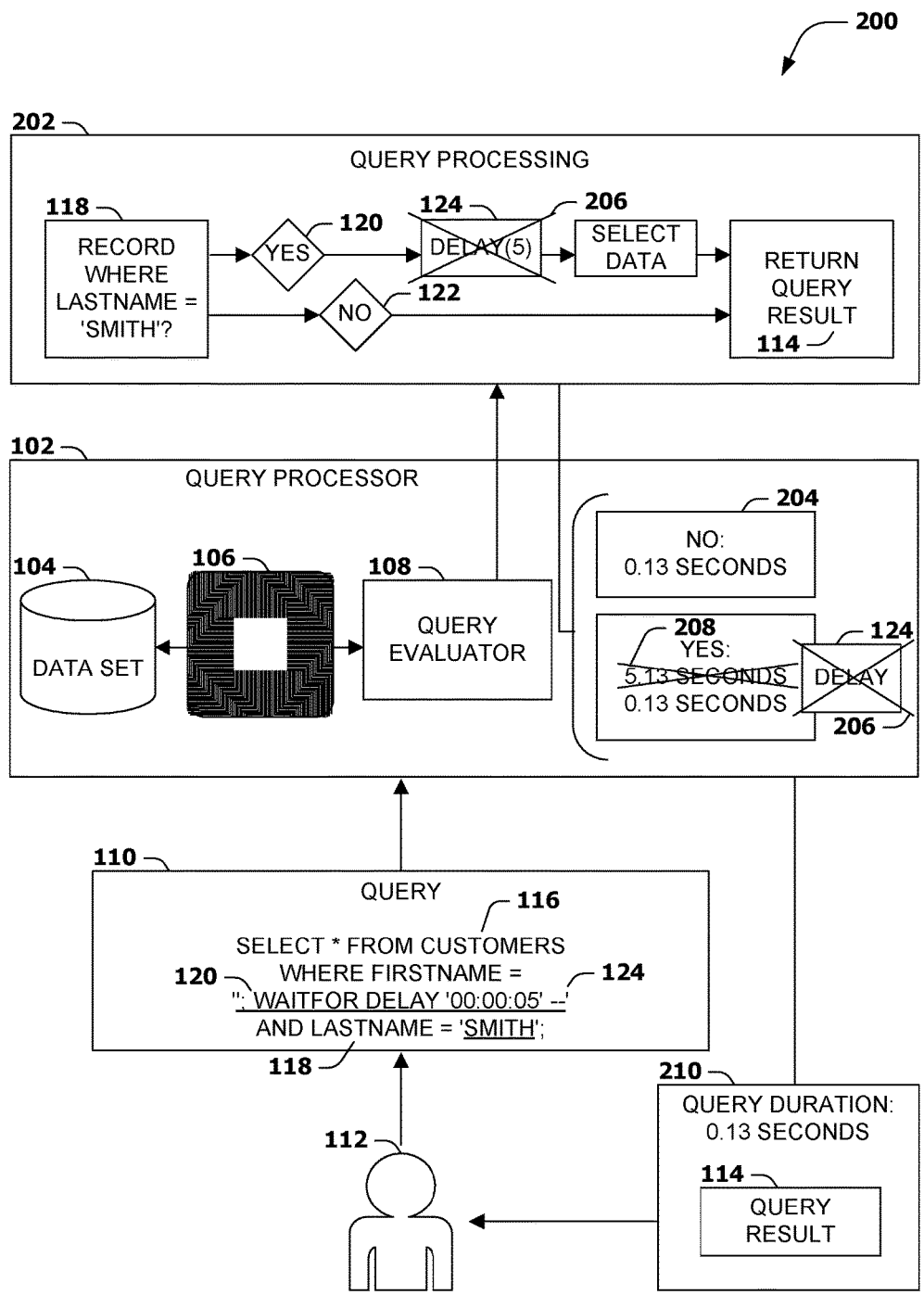
FIG. 2 is an illustration of an example scenario featuring an evaluation of a query against a data set, in accordance with the techniques presented herein.

FIG. 2 is an illustration of an example scenario 200 involving the evaluation of a query 110 in accordance with the techniques presented herein.

In this example scenario 200, a user 112 submits a query 110 to a query processor 102 for evaluation by a query evaluator 108 against a data set 104. The query 110 may be generated, e.g., by inserting user input received from the user 112 as parameters of a parameterized query 110, such as form fields that are inserted into encapsulated query slots of a query template. The query 110 presented by the user 112 includes a condition 118, upon which a first conditional branch 120 is taken that includes a differential delay 124 of the first conditional branch 120 as compared with a second conditional branch 122. In accordance with the techniques presented herein, the query processor 102 may identify the differential delay 124 presented on the first conditional branch 120 as compared with the second conditional branch 122. The query processor 102 may identify a query adaptation of the query 110 that reduces the differential delay, e.g., a query adaptation that involves canceling 206 the delay 124 on the first conditional branch 120. In this manner, whether or not the condition 118 has been satisfied, the first conditional path 120 and the second conditional branch 122 are completed in approximately the same amount of time. By applying the query adaptation during the query processing 202 while processing the query 112, the query evaluator 108 may reduce the differential delay 124 that reveals whether or not the condition 118 was satisfied. The query processor 102 may then return the query result 114 to the user 112 in fulfillment of the query 110 in accordance with the techniques presented herein.

C. Technical Effects

The use of the techniques presented herein in the field of query processing may provide a variety of technical effects.

A first technical effect that may be achievable through the use of the techniques presented herein involves the consistent application of the security policy of the data set 104 and/or the query processor 102. The security policy may specify that some properties of the data set 104 are not to be available for inspection, but the vulnerabilities created in various queries 110, using the conditional delay techniques described herein (e.g., via SQL injection or other mechanisms), may expose such properties to users 112. The techniques presented herein may reduce or block such unauthorized inspection of the data set 104 and/or the query processor 102, and may therefore maintain the security policy thereover.

A second technical effect that may be achievable through the use of the techniques presented herein involves the consistency of the evaluation of various queries 110. In some scenarios, it may be desirable to promote a consistent completion of various queries 110, such as to promote load-balancing (e.g., providing that if a first query processor 102 and a second query processor 102 that are assigned the same number of queries 110, it may be advantageous to enable both query processors 102 to complete the assigned queries 110 in approximately the same amount of time). If queries 110 include a differential delay 124 when executed in circumstances where the condition 118 may be evaluated differently, the queries 110 may complete in a different amount of time, thereby reducing such consistency in completion and/or consumption of resources. The application of a query adaptation (such as canceling 206 an instruction that causes a delay 124) may promote the consistent completion of the queries 110 even in different circumstances.

A third technical effect that may be achievable through the use of the techniques presented herein involves the preservation of the resources of the query processor 102 and the data set 104. In such scenarios, the inclusion of a delay 124 in a query 110 may bog down the resources of a query processor 102, e.g., causing a query 110 to take an unexpected and/or inordinate amount of time to complete. The query 110 may therefore inefficiently and even wastefully consume resources of the query processor 102, such as memory and processor capacity, while awaiting completion. The application of a query adaptation (such as canceling 206 an instruction that causes a delay 124) may promote the expedient completion of queries 110 and an economization of the resources of the query processor 102. Many such technical effects may be achievable through the use of the techniques presented herein.

D. Example Embodiments

Figure 3:
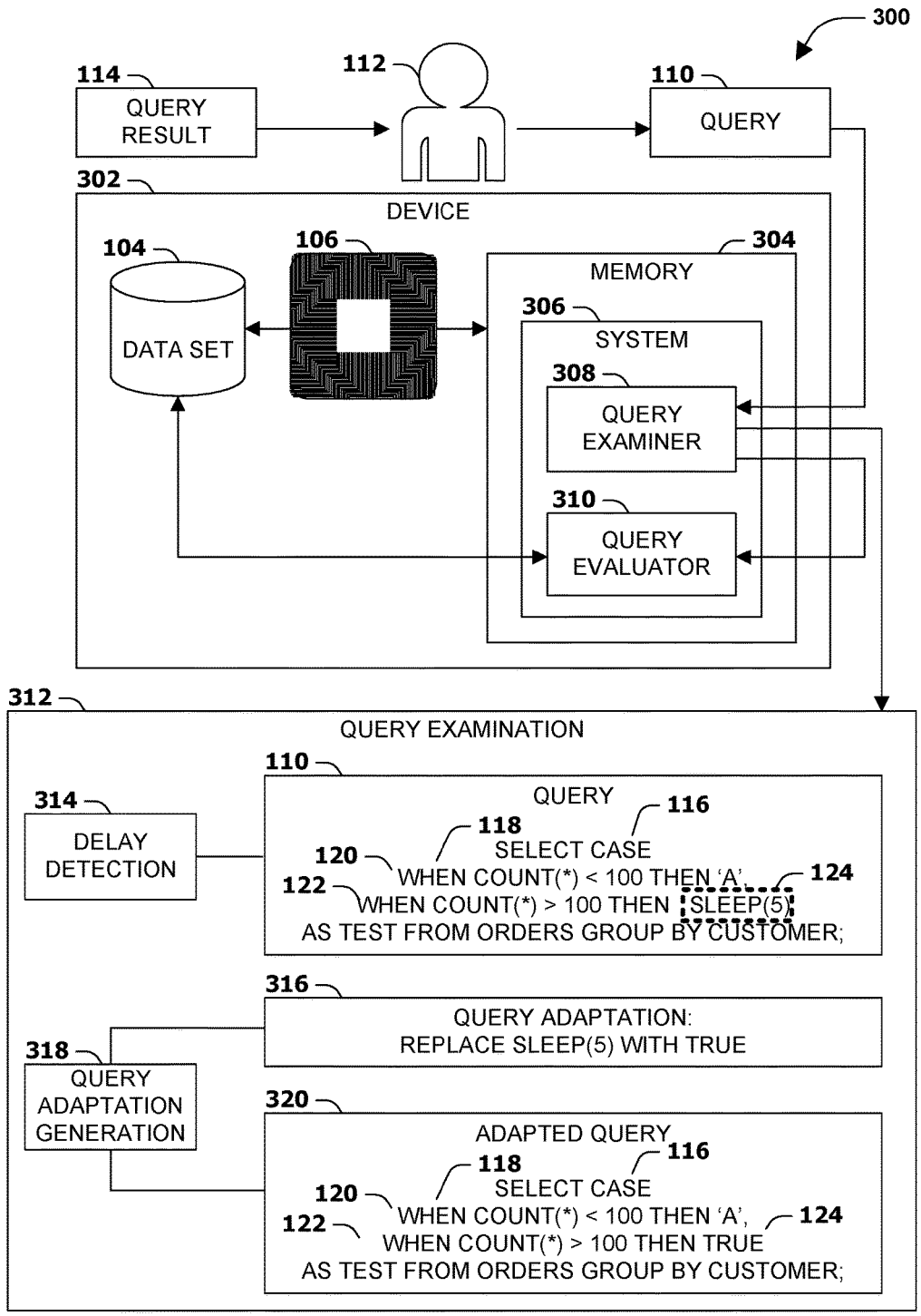
FIG. 3 is an illustration of an example scenario featuring an example system comprising an example device that evaluates of a query against a data set in accordance with the techniques presented herein.

FIG. 3 is an illustration of an example scenario 300 featuring some various embodiments of the techniques presented herein.

In this example scenario 300, an example device 302 operating as a query processor 102 receives a query 110 from a user 112 that is to be applied to a data set 104. The example device 302 comprises a processor 106 and a memory 304, such as a hardware nonvolatile and/or volatile memory device, or a hard disk drive, a solid-state storage device, storing instructions that, when executed by the processor 106, provide an example system 306 that evaluates the query 110 against the data set 104.

The example system 306 comprises a query examiner 308 that examines the query 110 to perform a delay detection 314 that identify a condition 118 between a first conditional branch 120 and a second conditional branch 122, and a processing delay 124 of the first conditional branch 120 as compared with the second conditional branch 122. The query examiner 308 further identifies a query adaptation generation 318 that generates a query adaptation 316 that reduces the processing delay 124 of the first conditional branch 120 as compared with the second conditional branch 122. The example system 306 further comprises a query evaluator 310 that evaluates the query 110 against the data set 104 according to the query adaptation 316 to produce the query result 114, and presents the query result 114 to the user 112 to fulfill the query 110. In this manner, the example device 302 and the example system 306 provided therein achieve the evaluation of the query 110 with a reduced differential delay 124 between the conditional branches of the condition 118, in accordance with the techniques presented herein.

Figure 4:
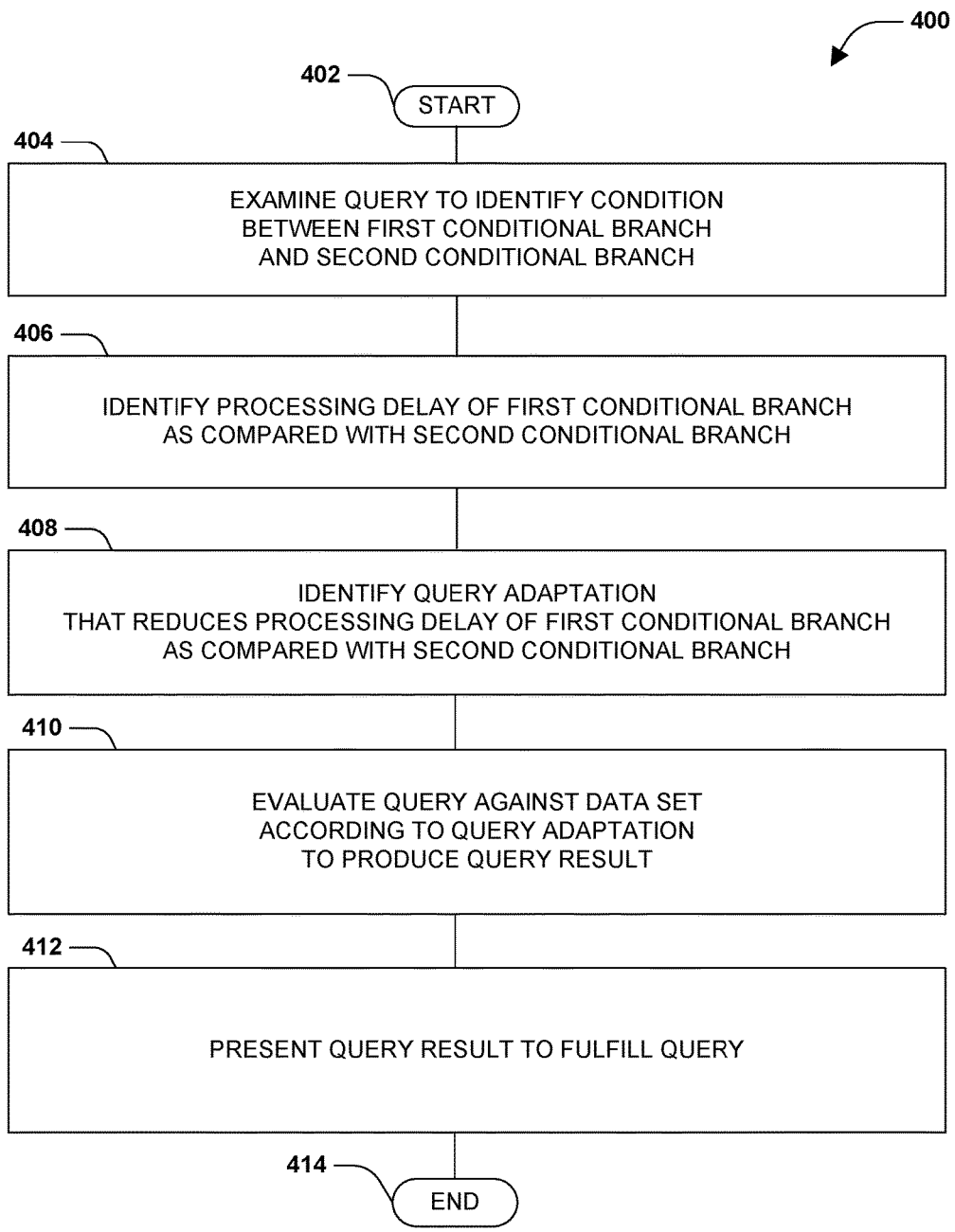
FIG. 4 is an illustration of an example method of evaluating a query against a data set in accordance with the techniques presented herein.

FIG. 4 is an illustration of an example method 400 of causing device 104 to evaluate a query 110 against a data set 104 in accordance with the techniques presented herein. The example method 400 involves a query processor 102 having a processor 106, and may be implemented, e.g., as a set of instructions stored in a memory 304 of the query processor 102, such as firmware, system memory, a hard disk drive, a solid-state storage component, or a magnetic or optical medium, wherein the execution of the instructions by the processor 106 causes the query processor 102 to operate in accordance with the techniques presented herein.

The example method 400 begins at 402 and involves executing the instructions on the processor 106. In particular, executing the instructions causes the query processor 102 to examine 404 the query 110 to identify a condition 118 between a first conditional branch 120 and a second conditional branch 122. Executing the instructions further causes the query processor 102 to identify 406 a processing delay 124 of the first conditional branch 120 as compared with the second conditional branch 122. Executing the instructions further causes the query processor 102 to identify 408 a query adaptation 318 that reduces the processing delay of the first conditional branch as compared with the second conditional branch. Executing the instructions further causes the query processor 102 to evaluate 410 the query against the data set according to the query adaptation to produce the query result. Executing the instructions further causes the query processor 102 to present 412 the query result to fulfill the query. Having achieved the processing of the query 110 through the application of the query adaptation 316, the example method 400 enables the processing of the query 110 in accordance with the techniques presented herein, and so ends at 414.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
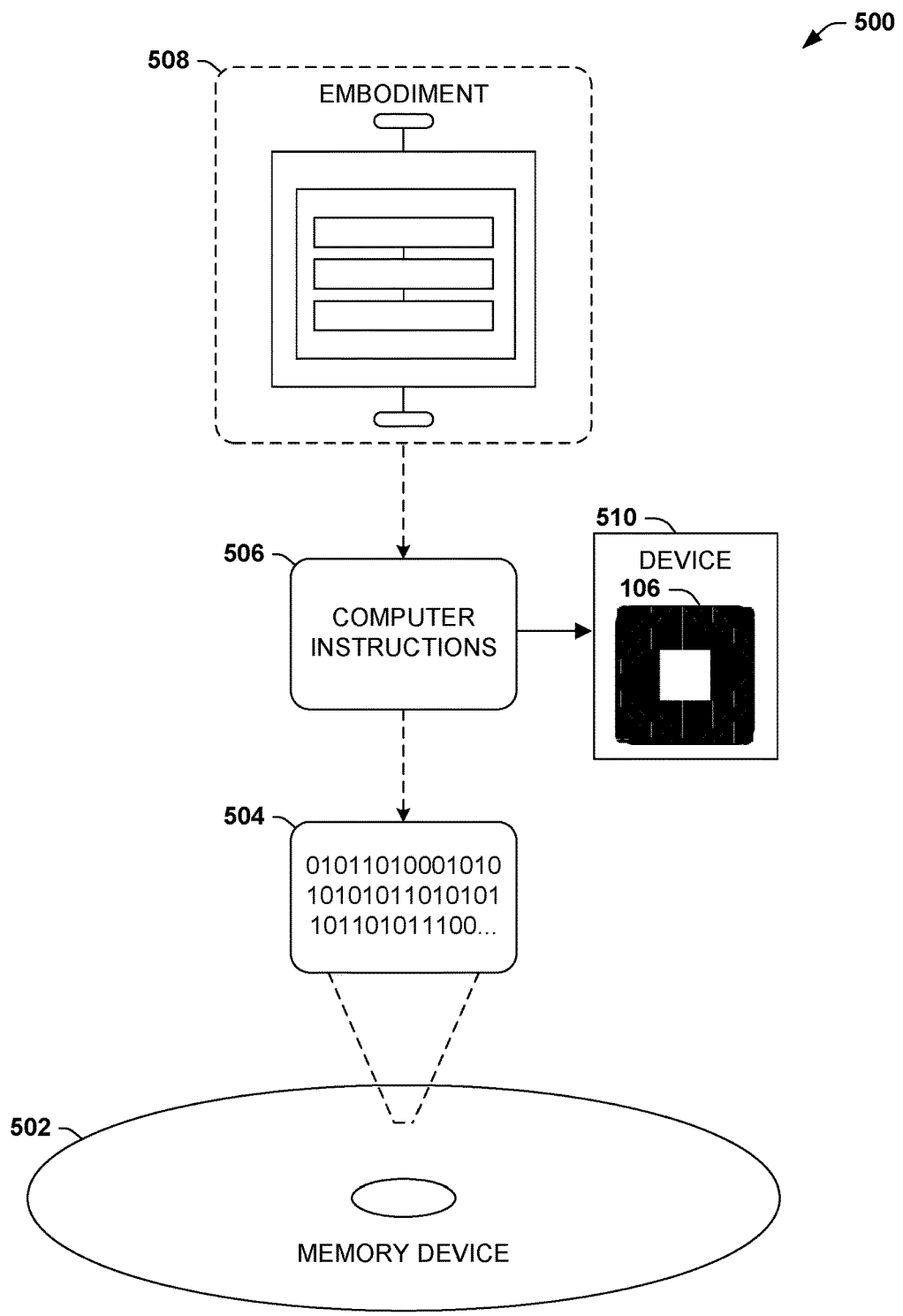
FIG. 5 is an illustration of an example computer-readable storage device storing instructions that cause a device to evaluate a query against a data set in accordance with the techniques presented herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 106 of a device 510, cause the device 510 to operate according to the principles set forth herein. For example, the processor-executable instructions 506 may cause a device to evaluate queries 110 with a reduced differential delay 124 between conditional branches of a condition 118, such as the example device 302 and/or the example system 306 in the example scenario 300 of FIG. 3. As another example, execution of the processor-executable instructions 506 may cause a device 104 to perform a method of evaluating queries 110 with a reduced differential delay 124 between conditional branches of a condition 118, such as the example method 400 FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example query processor 302 of FIG. 3; the example system 306 of FIG. 3; the example method 400 of FIG. 4; and/or the example computer-readable memory device 500 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized on a variety of devices 302, such as servers, workstations, laptops, consoles, tablets, phones, portable media and/or game players, embedded systems, appliances, vehicles, and wearable devices. Such devices 302 may also include collections of devices, such as a distributed server farm that provides a plurality of servers, possibly in geographically distributed regions, that interoperate to process queries 110 against a data set 104. Such devices 302 may also service a variety of users 112, such as administrators, guests, customers, clients, and other applications and/or devices 302.

As a second variation of this first aspect, the techniques presented herein may be utilized with a variety of data sets 104, including databases specified in formats such as variants of the Structured Query Language (SQL); MapReduce data sets; document stores that store documents in various formats; file systems that store a hierarchical arrangement of files. Such data sets 104 may also be distributed, e.g., over a set of servers, within a local area network (LAN) and/or over a wide-area network (WAN) distributed over a potentially geographic area.

As a third variation of this first aspect, the techniques presented herein may be utilized with a variety of queries 110, such as queries 110 that create, read, update, and/or delete records of the data set 104; queries 110 that create, read, update, and/or delete the schema and/or structure of the data set 104; queries 110 that create, read, update, and/or delete various metadata and/or ancillary data objects of the data set 104, such as user accounts, stored queries or procedures, and/or security policies; and queries 110 that create, read, update, and/or delete extraneous properties of the device 302 hosting and/or accessing the data set 104 and/or the query processor 102, including data sets 104 other than the data set 104 that is nominally targeted by the query 110. Many such scenarios may be devised in which the techniques presented herein may be effectively utilized.

E2. Condition Evaluation and Delays

A second aspect that may vary among embodiments of the techniques presented herein involves the identification of a condition 118 of a query 110 between at least two conditional branches, and the detection of a differential delay 124 on a first conditional branch 120 as compared with a second conditional branch 122.

As a first variation of this second aspect, the condition 118 may comprise a variety of conditions, such as a Boolean test (e.g., "WHERE <attribute>=<value>"); a selection followed by a particular logic to be performed on the matching records (e.g., "SELECT TOP(1) . . . "); and a calculation that may be followed by a set of logical operators applied to the resulting data set (e.g., "ORDER BY . . . "). The condition 118 may also explicitly designate a first conditional branch 120 evaluated under some results of the condition 118 and a second conditional branch 112 evaluated under other results of the condition 118 (e.g., "IF . . . THEN . . . ELSE," or "CASE" statements that provide different instructions for different values). Alternatively, the condition 118 may indicate some additional processing that is performed for the first conditional branch 120, where no such processing is performed for the second conditional branch 122, or vice versa (e.g., an "IF . . . THEN" clause with no "ELSE"

condition). In some scenarios, the processing of the first conditional branch 120 and the second conditional branch 122 may partially overlap, such as a function call that is invoked in either circumstance but with different parameters based on the condition 118. In the example scenario 100 of FIG. 2, the condition 118 comprises a first portion of a Boolean AND operation that is evaluated under "short-circuit" conditions, where the satisfaction of the first portion of the Boolean AND operation results in a further processing of the second portion of the Boolean AND operation (as the first conditional branch 120 featuring the differential delay 124), and the failure of the first portion of the Boolean AND operation results in the second portion of the Boolean AND operation being skipped due to mootness. Additionally, the condition 118 may be specified in the query 110 as provided by the user 112, and/or may be introduced into a query template of the data processor 102, using techniques such as SQL injection.

As a second variation of this second aspect, the delay 124 imposed on the first conditional branch 120 of the query 110 may be implemented in many ways. As a first such example, the delay 124 may comprise an explicit delay instruction in the first conditional branch 120, such as a WAITFOR, DELAY, SLEEP, or similar function. As a second such example, the delay 124 may comprise a computationally intensive operation inserted on the first conditional branch 120 that imposes the processing delay 124 on the first conditional branch 120. As a third such example, the delay 124 of the first conditional branch 102 may be incorporated in the condition 118; e.g., the condition 118 may comprise a pair of tests connected by a Boolean AND (e.g., "IF [A] AND [B]"), where the first test ("[A]") is the condition 118 that determines the conditional branch to be evaluates, and the second test ("[B]") is itself computationally intensive in a manner that imposes a delay on the completion of the Boolean AND (representing the first conditional branch 120), wherein the failure of the first test results in skipping the second test (representing the second conditional branch 122). Such computationally intensive operations may include, e.g., a full join operation connecting a large number of tables; a selection and/or projection operation over a large data set; and an operation that causes extensive communication among two or more devices, such as a comparison of data that is distributed over a set of server cluster, where the respective servers communicate over a network to complete the comparison. Many such variations may be included in the evaluation of conditions 118 and the types of delays 124 imposed on the conditional branches in accordance with the techniques presented herein.

E3. Delay Detection

A third aspect that may vary among embodiments of the techniques presented herein involves the manner of detecting the delay 124 between the conditional branches of a query 110.

As a first variation of this third aspect, the delay 124 imposed on the first conditional branch 120 of the query 110 may be detected in a variety of ways. As a first such example, a device 302 may store a delay instruction template set of delay instruction templates that identify operations that are capable of imposing the processing delay 124 on a query 110, and the device 302 may identify the processing delay 124 by identifying, in the first conditional branch 120, an instruction set that matches at least one of the delay instruction templates in the delay instruction template set. Such templates may also include, e.g., examples of query instructions that cause SQL injection and/or buffer overruns in queries 110 that appear to be safely evaluated until modified by such techniques.

As a second variation of this third aspect, a device 302 may estimate a first execution duration of instructions comprising the first conditional branch 120, and a second execution duration of instructions comprising the second conditional branch 122, and then compare the first execution duration and the second execution duration to identify the differential delay 124.

As a third variation of this third aspect, a device 302 may simulate execution of the first conditional branch 120 while measuring the first execution duration of the first conditional branch 120, and simulate execution of the second conditional branch 122 while measuring the second execution duration of the second conditional branch 122, and then compare the first execution duration and the second execution duration to identify a differential delay 124 in processing the conditional branches.

As a fourth variation of this third aspect, a device 302 may, while executing an instance of the query 110 on behalf of a clients, measure a first execution duration of the first conditional branch 120 and a second execution duration of the second conditional branch 122, and identify the differential delay 124 as a duration difference between the first execution duration and the second execution duration.

As a fifth variation of this third aspect, a device 302 may, while executing a first query 120 that contains the first conditional branch 120, measure a first execution duration of the first query 110; and while executing a second query 110 that contains the second conditional branch 122, measuring a second execution duration of the second query 110. The device 302 may then identify the differential delay 124 as a duration difference between the first execution duration of the first query 110 and the second execution duration of the second query 110.

As a sixth variation of this third aspect, a differential delay 124 may be identified only if it exceeds a duration difference threshold (e.g., a comparatively small differential delay 124 may be difficult to distinguish from ordinary variance in processing times, such as processing delays caused by variable network latency, processor load, and/or I/O bus load).

Figure 6:
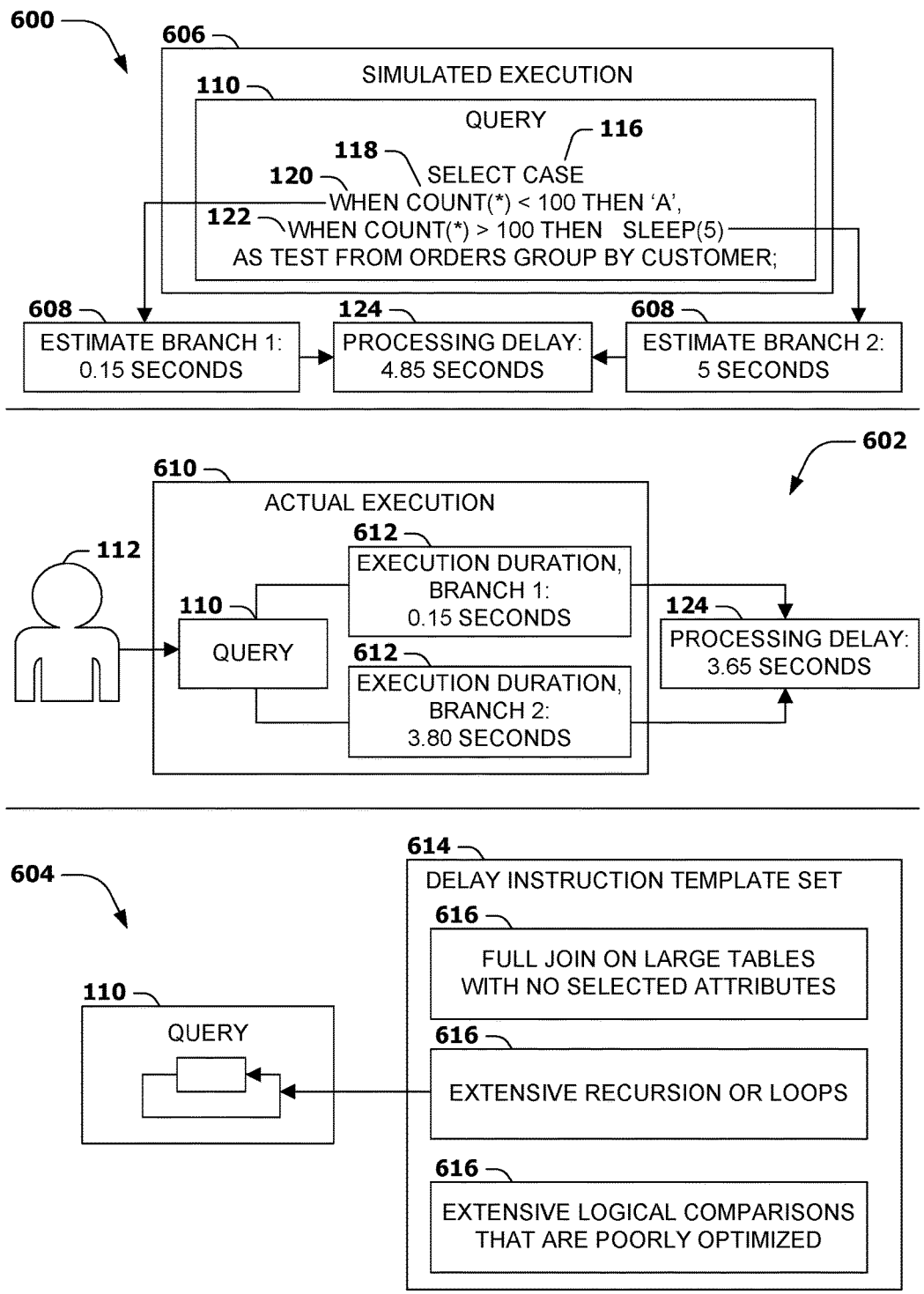
FIG. 6 is an illustration of various example scenarios for identifying a query delay between conditional branches of a query, in accordance with the techniques presented herein.

FIG. 6 is an illustration of some example scenarios featuring variations of this third variation of this second aspect. In a first example scenario 600, a device 302 performs a simulated execution 606 of a query 110, such as evaluating the query 110 in a simulated environment (rather than submitted by a user 112 against a live data set 104), and measures the query duration imposed by the evaluation 116 of a condition 118 and the resulting first conditional branch 120 and the second conditional branch 122, respectively, as a first conditional branch duration 608 and a second conditional branch duration 608. The comparison of conditional branch durations 608 may reveal a processing delay 204 between the conditional branches on account of the condition 118. In a second example scenario 602, when a user 112 submits a query 110 for evaluation against a data set 104, a device 302 may perform an actual execution 610 of the query 110 against the data set 104 and measure the actual execution durations 612 of the conditional branches, and may compare the execution durations 612 to identify a processing delay 204 between the conditional branches. In a third example scenario 604, a delay instruction template set 614 of delay instruction templates 616 that may be provided with templates of instructions that, when present in a query 110, may impose a processing delay 204. Such delay instruction templates 616 may include, e.g., full joins on large tables, particularly where no attributes of the full join are later included in a projection into the query result 114 or otherwise affect the processing of the query 110; extensive levels of recursion and/or looping; and/or logical comparisons that are poorly optimized, such as redundant comparisons of parameters or sorting and re-sorting on different attributes. The device 104 may use the delay instruction template set 614 to identify the presence of a delay instruction template 616 in a query 110 that may create a differential delay 124 of a first conditional branch 120 as compared with a second conditional branch 122. Many such techniques may be included herein to detect a delay 124 in a query 110, including variations in the instruction templates 616 that may be provided to detect such delay 124, in accordance with the techniques presented herein.

E4. Query Adaptations

A fourth aspect that may vary among embodiments of the techniques presented herein involves the manner of adapting a query 110 to reduce a differential delay 124 of a first conditional branch 120 as compared with a second conditional branch 122.

As a first variation of this fourth aspect, the query adaptation 316 may involve reducing and/or canceling a delay instruction that is detected in the first conditional branch 120. That is, the first conditional branch 120 may include a delay structure that imposes a delay 124 on the first condition branch 120, and the query adaptation 316 may comprise refraining from executing the delay structure while executing the first conditional branch 120. For example, as illustrated in the example scenario 200 of FIG. 2, an instruction that imposes an idle wait on a processor 106 may be skipped and/or removed from the query 110.

As a second variation of this fourth aspect, the query adaptation 316 may involve supplementing the second conditional branch 120 with a supplemental delay that reduces the processing delay 124 of the first conditional branch 120 as compared with the second conditional branch 122. For example, if the first conditional branch 120 involves a calculation that is estimated to entail three seconds while the second conditional branch 122 is estimated to complete in one second, the query adaptation 3167 may involve inserting a supplemental two-second delay into the second conditional branch 122 to reduce the differential delay 124 between the conditional branches.

As a third variation of this fourth aspect, the differential delay 124 may involve a computationally intensive operation in the first conditional branch 120 that imposes the processing delay 124 (e.g., a FULL JOIN operation that involves combining records from different tables). The query adaptation 316 may involve replacing the computationally intensive operation with a null operation, particularly if the computationally intensive operation is not further used in the query 110 after completion.

As a fourth variation of this fourth aspect, even if the source of a delay 124 is difficult to isolate in a query 110, a query adaptation 316 may be applied that imposes, on the first conditional branch 120, an execution duration threshold beyond which the first conditional branch 120 is not permitted to execute. For example, a maximum execution duration (e.g., five seconds) may be imposed on one or both conditional branches, such that delays 124 that involve protracted execution may be curtailed.

As a fifth variation of this fourth aspect, a query adaptation 316 may be applied before executing the query 110 (e.g., by modifying the logical instructions and/or structure of the query 110), and/or may be applied on an ad-hoc or just-in-time basis (e.g., by altering the execution of the query 110 while it is being executed).

Figure 7:
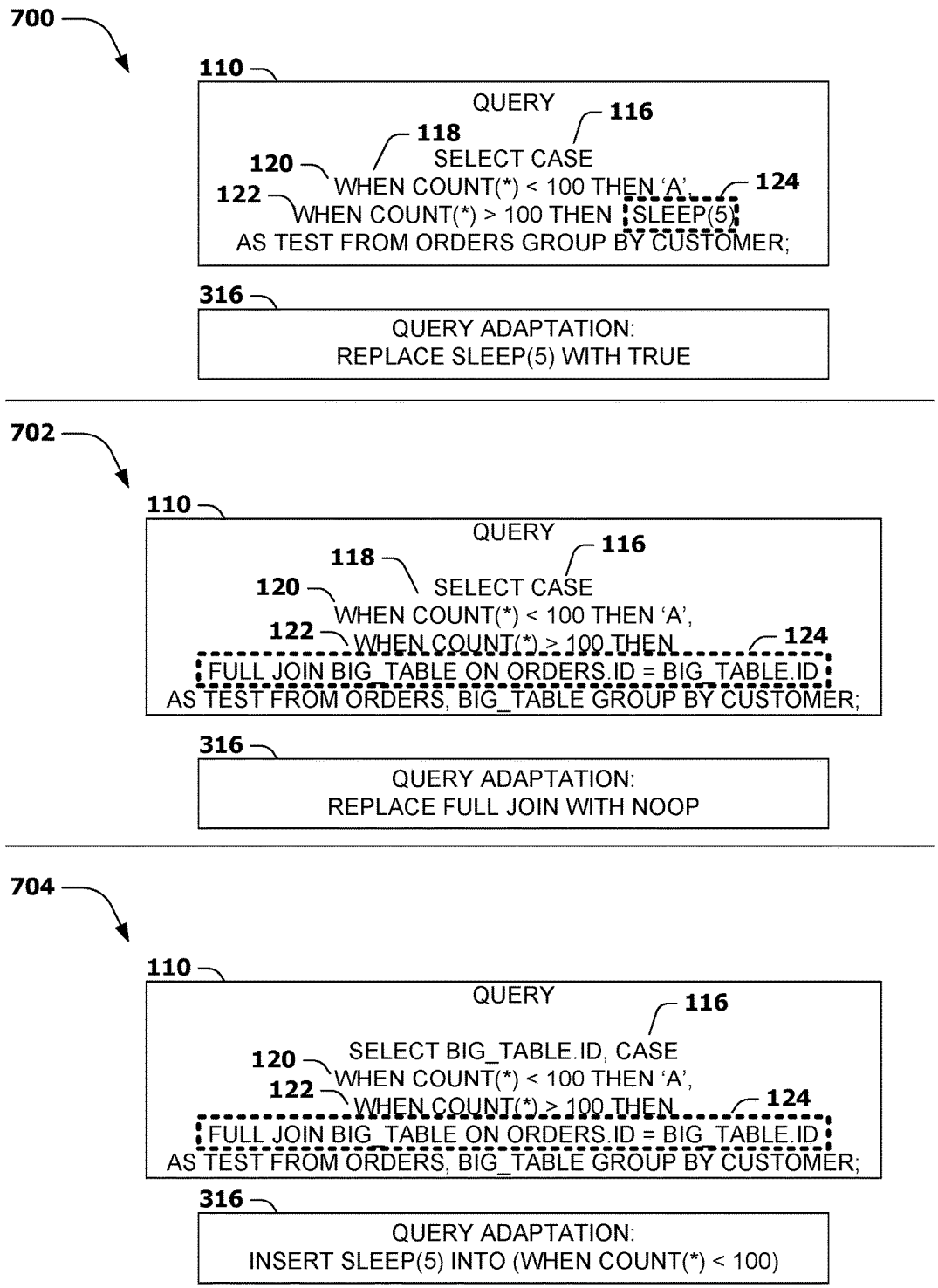
FIG. 7 is an illustration of a various types of query delays that may be presented in various queries, in accordance with the techniques presented herein.

FIG. 7 is an illustration of a set of example scenarios wherein various query adaptations 316 are applied to the conditional branches of various queries 110. In a first example scenario 700, a delay 124 may be presented as an explicit idle, sleep, or wait instruction on the first conditional branch 120 of the query 110, and the query adaptation 316 may involve replacing the delay 124 with a null operation (e.g., replacing the operation with a True value). In a second example scenario 702, a complex calculation is present in the first conditional branch 120 of the query 110 that is not thereafter utilized in the query 110, and the query adaptation 316 involves replacing the calculation with a null operation. In a third example scenario 704, a complex calculation is presented in the first conditional branch 120 and is later utilized in the query 110, such that removing the complex calculation causes the query 110 to fail. Instead, a query adaptation 316 may be applied that inserts a supplemental delay into the second conditional branch 122 that matches an estimate of the execution duration of the complex calculation, thus reducing the differential delay 124 between the conditional branches. These and other query adaptations 316 may be utilized to reduce the differential delay 124 of the conditional branches of a query 110 in various embodiments of the techniques presented herein.

E5. Selective Protection

A fifth aspect that may vary among embodiments of the techniques presented herein involves a selective application of the protective features presented herein. It may be appreciated that the protection of the data set 104 and/or query processor 102 provided herein may alter the performance thereof (e.g., causing some queries 110 to fail and/or produce incorrect results, and/or operate in an inefficient manner), and that a selective application of such techniques may be utilized to mitigate such potential disadvantages.

As a first variation of this fifth aspect, a query processor 102 may further comprise an administrative interface that permits an administrative user 112 to select a query processor security option to apply to the query processor 102. A query evaluator 310 may utilize query adaptations 316 to evaluate queries 110 against data sets 104 only on condition of the query processor security option having been selected for application to the query processor 102.

As a second variation of this fifth aspect, a query processor 102 may evaluate a query set of queries 110, and a query evaluator 310 may utilize query adaptations 316 to evaluate a first query subset of the query set against the data set 104, while refraining from utilizing query adaptation 316 to evaluate a second query subset of the query set against the data set 104. For example, the first query subset may comprise non-time-sensitive queries of the query set, while the second query subset may comprise time-sensitive queries of the query set.

As a third variation of this fifth aspect, a query examiner 308 may further comprise a query performance estimator that determines a query processor performance adaptation that is incurred by the query processor 102 while utilizing the query adaptation 316 to evaluate the query 110 (e.g., a magnitude of performance loss incurred by applying one or more query adaptations 316 to queries 110). The query evaluator 310 may further utilize query adaptations 316 to evaluate queries 110 against the data set 104 only on condition of the query processor performance adaptation remaining within a query processor performance adaptation tolerance. As another example, a query examiner 308 may further identify a duration difference between the first execution duration and the second execution duration that exceeds a duration difference threshold (e.g., detecting that the first conditional branch 120 of a query 110 is likely exceed a second conditional branch 122 of the query 110 by at least five seconds), and the query evaluator 310 may further utilize query adaptations 316 to evaluate queries 110 against the data set 104 only on condition of the duration difference exceeding a duration difference threshold.

As a fourth variation of this fifth aspect, a query evaluator 310 may utilize query adaptations 316 to evaluate queries 110 against the data set 104 only to a first query 110 and a second query 110 that are submitted to the query processor for concurrent evaluation, wherein the first query 120 further comprises the first conditional branch 120 and the second query 110 further comprises the second conditional branch 122. That is, two different queries 110 may be submitted in parallel for concurrent or near-concurrent evaluation, and the query adaptation 316 may be utilized to reduce a differential delay 124 therebetween. Such selective adaptation may be advantageous, e.g., because queries 110 submitted at significantly different times may exhibit significantly different processing durations only because the state of the query processor 102 has materially changed in the interim, such that the diagnostic value of the delay 124 is less valuable. Many such variations in the selective application of query adaptation 316 may be included in variations of the techniques presented herein.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description.

Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device that provides a query result in response to a query over a data set, the device comprising:
a processor; and
a memory storing instructions that, when executed by the processor, cause the device to provide:
a query examiner that:
examines the query to identify a condition between a first conditional branch and a second conditional branch;
identifies a processing delay of the first conditional branch as compared with the second conditional branch; and
identifies a query adaptation that reduces the processing delay of the first conditional branch as compared with the second conditional branch; and a query evaluator that:
evaluates the query against the data set according to the query adaptation to produce the query result; and
presents the query result to fulfill the query.

2. The device of claim 1, wherein identifying the query adaptation further comprises: supplementing the second conditional branch with a supplemental delay that reduces the processing delay of the first conditional branch as compared with the second conditional branch.

3. The device of claim 1, wherein:
identifying the processing delay further comprises: identifying, in the first conditional branch, a delay structure that imposes a delay on the first condition branch; and
identifying the query adaptation further comprises: refraining from executing the delay structure while executing the first conditional branch.

4. The device of claim 1, wherein:
identifying the processing delay further comprises: identifying, in the first conditional branch, a computationally intensive operation that imposes the processing delay on the first conditional branch; and
identifying the query adaptation further comprises: replacing the computationally intensive operation with a null operation.

5. The device of claim 1, wherein identifying the query adaptation further comprises: imposing, on the first conditional branch, an execution duration threshold beyond which the first conditional branch is not permitted to execute.

6. A device that provides a query result in response to a query over a data set, the device comprising:
a processor; and
a memory storing instructions that, when executed by the processor, cause the device to:
examine the query to identify a condition between a first conditional branch and a second conditional branch;
identify a processing delay of the first conditional branch as compared with the second conditional branch; and
identify an adapted query according to a query adaptation that reduces the processing delay of the first conditional branch as compared with the second conditional branch; and
provide the adapted query to a query evaluator configured to evaluate the query against the data set according to the query adaptation to produce the query result, and present the query result to fulfill the query.

7. The device of claim 6, wherein the instructions are further executable to:
receive, from an administrative user, a selected query processor security option; and
cause the query evaluator to utilize the query adaptation to evaluate the query against the data set only on condition of the selected query processor security option.

8. The device of claim 6, wherein the instructions are further executable to:
receive a query set of queries; and
cause the query evaluator to use the query adaptation to evaluate a first query subset of the query set against the data set, while refraining from utilizing the query adaptation to evaluate for a second query subset of the query set against the data set.

9. The device of claim 8, wherein:
the first query subset further comprises non-time-sensitive queries of the query set; and
the second query subset further comprises time-sensitive queries of the query set.

10. The device of claim 6, wherein the instructions are further executable to:
determine a query processor performance adaptation that would be incurred while utilizing the query adaptation to evaluate the query; and
cause the query evaluator to utilize the query adaptation to evaluate the query against the data set only on condition of the query processor performance adaptation within a query processor performance adaptation tolerance.

11. The device of claim 6, wherein the instructions are further executable to:
identify a duration difference between a first execution duration of executing instructions comprising the first conditional branch and a second execution duration of executing instructions comprising the second conditional branch, wherein the duration difference exceeds a duration difference threshold; and
cause the query evaluator to utilize the query adaptation to evaluate the query against the data set only on condition of the duration difference exceeding the duration difference threshold.

12. The device of claim 6, wherein the instructions are further executable to cause the query evaluator to utilize the query adaptation to evaluate the query against the data set by concurrently evaluating a first query and a second query, wherein the first query further comprises the first conditional branch and the second query further comprises the second conditional branch.

13. A method of causing a device to provide a query result in response to a query over a data set, the method comprising:
examining the query to identify a condition between a first conditional branch and a second conditional branch;
identifying a processing delay of the first conditional branch as compared with the second conditional branch;
identifying a query adaptation that reduces the processing delay of the first conditional branch as compared with the second conditional branch;
evaluating the query against the data set according to the query adaptation to produce the query result; and
presenting the query result to fulfill the query.

14. The method of claim 13, wherein identifying the processing delay further comprises: identifying an explicit delay instruction in the first conditional branch.

15. The method of claim 13, wherein identifying the processing delay further comprises: identifying, in the first conditional branch, a computationally intensive operation that imposes the processing delay on the first conditional branch.

16. The method of claim 13, wherein:
the device further stores a delay instruction template set of delay instruction templates that identify operations that are capable of imposing the processing delay on a query; and
identifying the processing delay further comprises: identifying, in the first conditional branch, an instruction set that matches at least one of the delay instruction templates in the delay instruction template set.

17. The method of claim 13, wherein identifying the processing delay further comprises:
estimating a first execution duration of instructions comprising the first conditional branch;
estimating a second execution duration of instructions comprising the second conditional branch; and
identifying a duration difference between the first execution duration and the second execution duration that exceeds a duration difference threshold.

18. The method of claim 17, wherein:
estimating the first execution duration further comprises: simulating execution of the first conditional branch while measuring the first execution duration of the first conditional branch; and
estimating the second execution duration further comprises: simulating execution of the second conditional branch while measuring the second execution duration of the second conditional branch.

19. The method of claim 13, wherein identifying the processing delay further comprises:
while executing at least one instance of the query on behalf of a client:
measuring a first execution duration of the first conditional branch;
measuring a second execution duration of the second conditional branch; and
identifying a duration difference between the first execution duration and the second execution duration that exceeds a duration difference threshold.

20. The method of claim 13, wherein identifying the processing delay further comprises:
while executing a first query that contains the first conditional branch, measuring a first execution duration of the first query;
while executing a second query that contains the second conditional branch, measuring a second execution duration of the second query; and
identifying a duration difference between the first execution duration of the first query and the second execution duration of the second query that exceeds a duration difference threshold.

* * * * *